W. A. BLACK.
RESILIENT WHEEL.
APPLICATION FILED JAN. 16, 1918.

1,277,537.

Patented Sept. 3, 1918.
2 SHEETS—SHEET 1.

INVENTOR
William A. Black.
BY
Fred G. Dieterich
ATTORNEYS

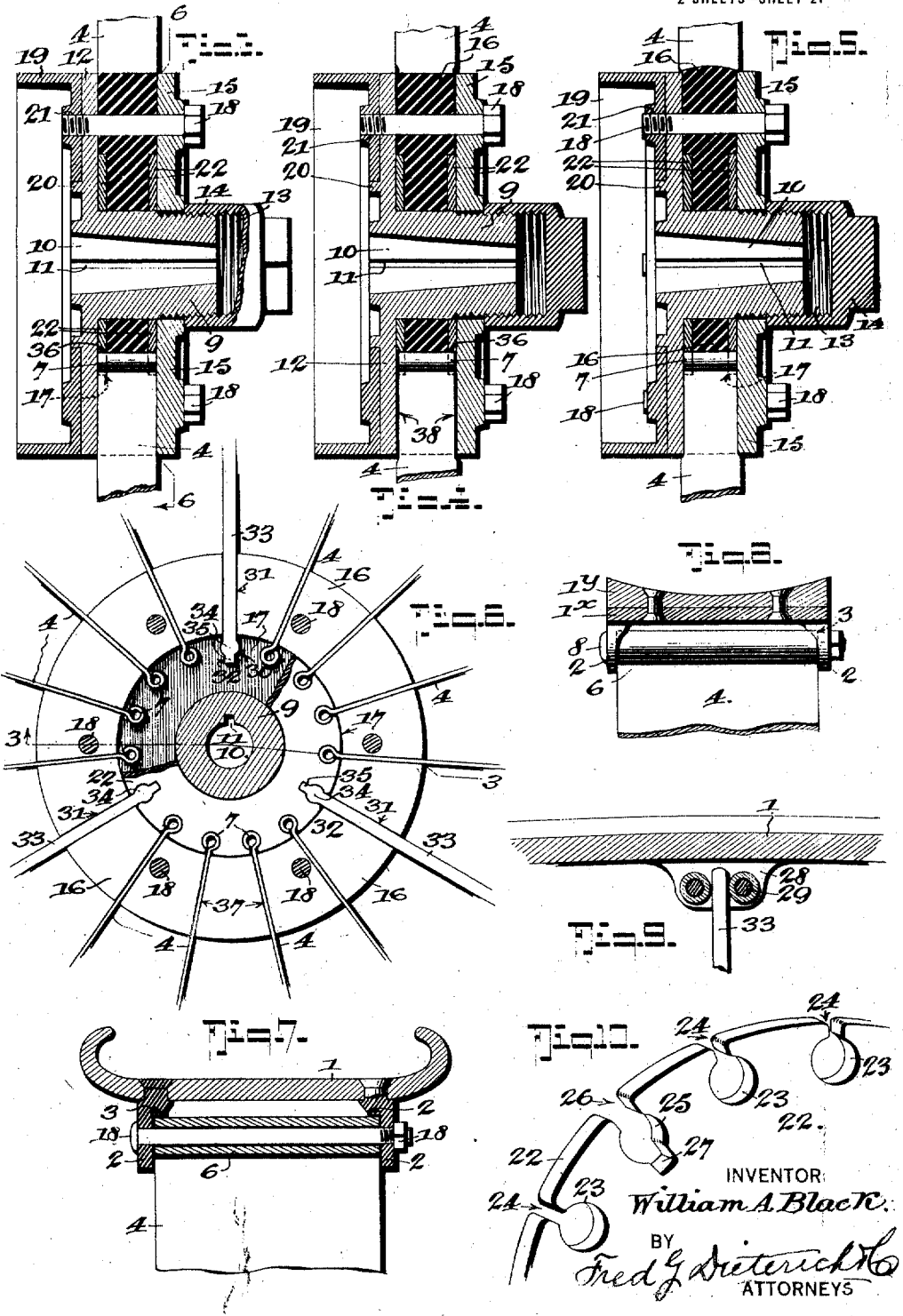

UNITED STATES PATENT OFFICE.

WILLIAM A. BLACK, OF SPOKANE, WASHINGTON.

RESILIENT WHEEL.

1,277,537.

Specification of Letters Patent.

Patented Sept. 3, 1918.

Application filed January 16, 1918. Serial No. 212,078.

*To all whom it may concern:*

Be it known that I, WILLIAM A. BLACK, at present residing at Spokane, in the county of Spokane and State of Washington, have invented certain new and useful Improvements in Resilient Wheels, of which the following is a specification.

This invention relates to improvements in resilient wheels and more particularly to that class of wheels designed to eliminate and take the place of a conventional pneumatic or other tread cushioning means such as are commonly employed for motor vehicles.

The principal object of the invention is the provision of a wheel of the foregoing character which will serve in a most practical manner all the purposes of a pneumatic tire and in addition provide a wheel that will provide increased resiliency between the tread and the driving axle to eliminate undue shock, incident to road travel and to absorb the excessive vibration due to rigid construction that also causes crystallization of the axle.

A further object of the invention consists in providing a resilient wheel in which the spokes are formed of flat springs and provided with means whereby vibration of the individual spokes and shocks will be absorbed before being passed on to their connections with the metal hub.

Again, the invention has for its object to provide substantially rigid traction-spokes in combination with the spring-spokes, by means of which undue torque and pull strains on the spring-spokes may be avoided and the turning stresses encountered when the wheel is a driver wheel will be promptly transmitted to the rim from the hub, thus leaving the spring-spokes free to function properly and absorb the shocks to the maximum degree.

The invention furthermore includes those novel details of construction, combination and arrangement of parts, all of which will be first fully described, then specifically pointed out in the appended claims and illustrated in the accompanying drawings, in which:

Fig. 3 is a detail cross section through the hub structure on substantially the line 3—3 of Fig. 6 showing the normal coöperative position of the parts when the wheel is new.

Fig. 4 is a view similar to Fig. 3 showing the position of the parts when wear has taken place and the spokes have become loosened up.

Fig. 5 shows the same parts as in Fig. 4 after they have been tightened up to take up the wear.

Fig. 6 is a cross section on substantially the line 6—6 of Fig. 3, a part of the spoke-retaining disk being broken away.

Fig. 7 is a detail cross section through the rim and the spoke-holding lugs.

Fig. 8 is a detail cross section of a modified rim structure.

Fig. 9 is a detail longitudinal section showing the connection between the rim end of the traction-spoke and the rim.

Fig. 10 is a detail perspective view of a portion of one of the spoke-holding or retaining disks.

Figure 1:
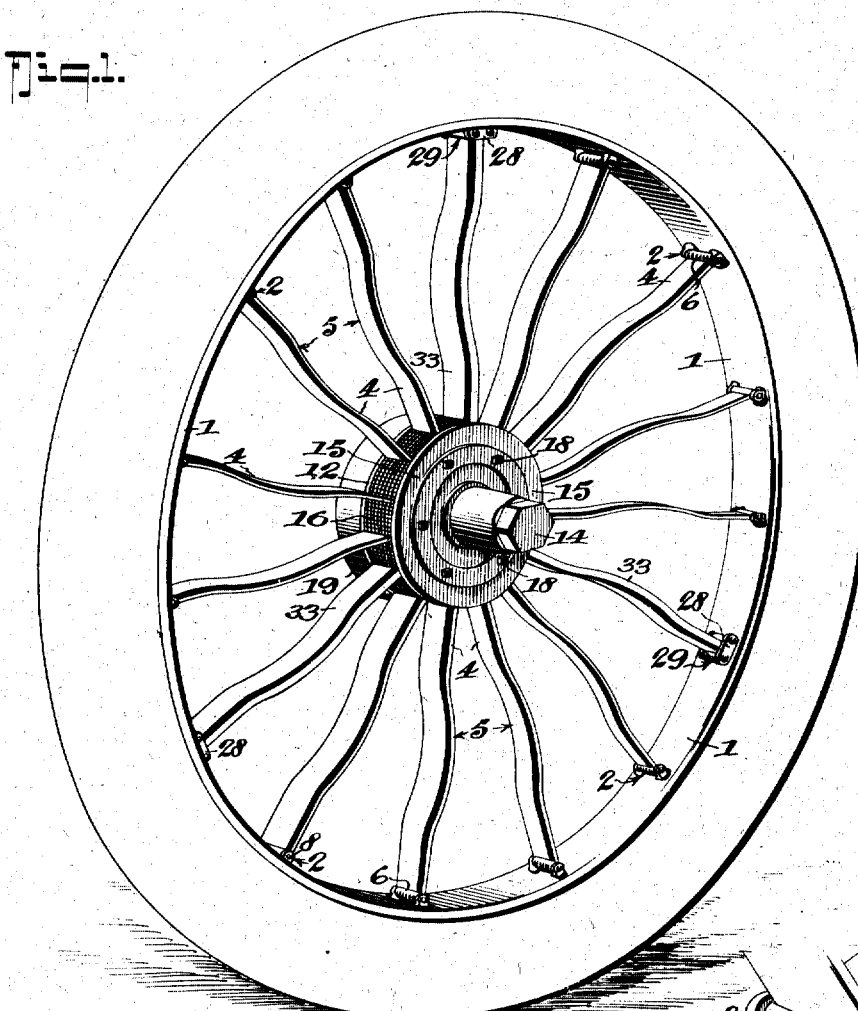
Figure 1 is a perspective view of my invention, the wheel being designed as a driving wheel.
Figure 2:
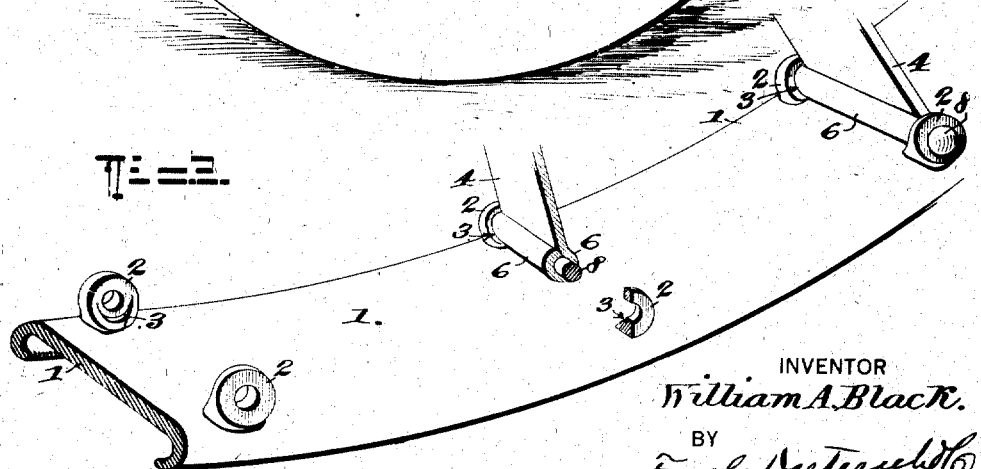
Fig. 2 is an enlarged detail perspective view partly in section showing the connections between the spokes and the rim.

Referring to the accompanying drawings, in which like numerals of reference indicate like parts in all of the figures, 1 represents the rim which may be of any of the standard types of conventional cross section, and the rim may be made in one piece, as in present practice, (see Fig. 2) or it may be made of a plurality of bands $1^x$—$1^y$ riveted or otherwise fastened together, (see Fig. 8).

The rim is provided with pairs of ears or lugs 2 for the reception of the eye ends 6 of the spring-spokes 4 to which the said ends 6 are pivoted by bolts 8. In order to form a bearing for the spoke ends 6 and prevent engagement between such ends and the rim, the ears or lugs 2 have concave seats 3 adjacent to the rim against which the spoke ends 6 bear.

The hub structure, which constitutes one of the important features of the invention, comprises a spindle 9 bored at 10 to fit on the shaft, and when the wheel is to be used as a driver wheel, the spindle may be provided with a key-band 11, (see Fig. 3). On the spindle are two flanges one 12, being fixed thereon while the other 15, has a sliding fit on the spindle and is adjustable toward the fixed flange by bolts 18 and by a cap 14 that fits the end 13 of the spindle.

The flange 12 may have a projecting portion 20 on its back to receive a brake drum 19 which also serves as a "nut" for the bolts 18, (it being bored and tapped at 21 for the purpose) when the wheel is used as a driving wheel. Of course, when the wheel is not used as a driver, drum 19 may be omitted and ordinary nuts substituted for cooperation with the bolts 18.

Between the flanges 12 and 15 is a pair of metal spoke-retaining disks 22 which fit on the spindle 9 and have radial slots 24 merging at their inner ends with recesses 23 in which the beaded or eye ends 7 of the spring-spokes 4 seat. Each disk 22 is also provided with radial slots 26—27 merging with intermediate recesses 25 for the reception of the ends 32 of the traction-spokes 33, the beads 30 of which lie in the recesses 25.

Between the disks 22 is a compressible disk 16 of rubber or any resilient composition that will properly and effectively provide semi-rigid support for the inner ends of the spring-spokes. The disk 16 is of greater diameter than the disks 22 (about equal one of the flanges 12 or 15) and it preferably has depressions 17 to receive the disks 22. The disk 16 has radial spring-spoke receiving slots 37 and recesses 36 and it also is provided with traction-spoke receiving slots 31—32 and recesses 30 corresponding to the adjacent similar parts of the disks 22.

The bolts 18 preferably pass through the disk 16 at points beyond the periphery of the disks 22 for a purpose hereinafter understood.

The spring-spokes 4 have straight end portions and an intermediate bowed portion 5, the purpose of which will later appear.

The traction-spokes 33 are of heavier structure and are relatively stiff or rigid and while they too have straight end portions and intermediate bowed portions, the outer ends are not fastened to the rim nor do the outer ends have eyes like the spring-spokes but the outer ends of the spring-spokes project between side ears 28 on the rim 1 or rim band 1ˣ, as the case may be, which ears serve to restrain the said spokes and rim against relative lateral or side movements, while roller carrying bolts 29 are located in front and in back of the ends of the spokes 33 between the ears 28 to take the driving strains. The outer ends of the traction-spokes do not extend into contact with the rim, (see Fig. 9) so as to allow for the free action of the spring-spokes in going over road obstructions. A limited movement is thus provided for the rim but should the movement become extreme, the ends of the traction-spokes would touch the rim and prevent further movement or movement past the desired limits which would unduly effect the spring-spokes or place them past their limits of endurance.

When the wheel is assembled, the curved spring-spokes will bear the weight of the vehicle and will absorb the shock through their length under running conditions. By reason of their pivotal connection with the rim and the hub, the wheel will be allowed a slight circumferential movement with respect to the hub and to make this movement resilient and provide that it will normally maintain a position with the spokes radially projecting from the hub, advantage is taken of the resilient body 16 which engages the ends of the spokes nearest the hub so that a movement of any one spoke or series of spokes will cause stress upon the resilient filler to provide a slight give and will insure the return of the spokes to the proper position when the strain has been removed. Thus when the wheel is used as a driver and power is applied to the driving shaft the first strain will be absorbed in the hub and thence transferred to the spokes and thus smooth riding qualities are provided both in the circumferential resiliency and in the radial. It will also be noted by reference to the drawings, that the spokes directly below the center of the wheel will be under compression and the spokes directly above under tension so that at all times the spokes in opposite directions function with each other to more perfectly adjust the strain.

By means of my construction, I am enabled by removing the flange plate 15 to remove or replace any individual spoke without the necessity of removing the entire wheel from the vehicle. This may be easily accomplished by first withdrawing the pin connecting the spoke and the rim and withdrawing the opposite end from the slot in its connection with the hub.

It will be further observed that by employing the stiff or relatively rigid traction-spokes, relative annular motion between the rim and the hub is in large measure avoided, thus reducing the stresses on the spring-spokes which would cause too great bending of the same, especially adjacent to the disks 22 and crystallization of the spoke metal with constant breakage is avoided.

Since the disks 22 are not positively keyed or fastened to the spindle 9 or to the flanges 12 and 15, they can give or creep annularly on the spindle should an unusual torque be applied which might unduly bend the spoke-hub-ends. Under ordinary use, the disks 22 are held immovable by the frictional contact with the disk 16 and with the flanges 12 and 15.

In order to still further reduce the danger of relative twist between the hub and rim, the traction-spokes do not have pivotal motion with relation to the disks 22 but are keyed fast by the ends 33 which rest in the slot extension 27, thus making the traction-spokes and disks 22 a rigid unit, as it were.

Either a pneumatic tire or one of hard rubber or of any composition desired may be used, but it is preferred to use non-puncturing or hard tires since the resiliency of a pneumatic tire is not necessary here.

The number of traction-spokes used in a wheel will depend upon the services it is intended to give, but I prefer to employ an odd number so that the spring-spokes may be enabled to function properly regardless of the particular point at which the impact of the road obstruction is applied.

Various minor changes in the design, proportion of parts and other details of construction may be made by those skilled in the art to which the invention relates in in order to meet the various conditions encountered in practice, without departing from the spirit of the invention and the scope of the appended claims.

So far as this application contains any matter in common with my application filed September 27, 1917, Serial No. 193,411, the present application is a continuation thereof.

What I claim is:—

1. A spring wheel including a rim, a hub formed with recesses enlarged at their inner ends, spring-spokes having terminals formed to coöperate with the recesses and adapted to be engaged with the latter by laterally sliding movements of the parts, the outer ends of said spring-spokes having pivotal connection with the rim, and traction-spokes having terminals formed to coöperate with recesses in the hub, and adapted to be engaged with the same by laterally sliding movements of the parts, brackets carried by the rim and slidably receiving the outer ends of the traction-spokes, and means connecting the spring-spokes to the rim.

2. A spring wheel comprising a hub, a rim, a plurality of flat spring-spokes connecting the hub and rim, a plurality of traction-spokes secured in fixed relation to the hub and slidably connected with the rim, said traction spokes having the same general form as the spring spokes, whereby said traction spokes will flex under excessive compression strains.

3. A spring wheel comprising a hub, a rim, a plurality of flat spring-spokes connecting the hub and rim, a plurality of traction-spokes secured in fixed relation to the hub and radially slidably connected with the rim, said traction spokes having the same general form as the spring spokes, whereby said traction spokes will flex under excessive compression strains.

4. A spring wheel comprising a hub, a rim, and a plurality of spokes connecting the rim and the hub, said hub consisting of a central spindle and a flange fixed thereon, a flange slidably mounted on the spindle, spring supporting disks mounted between said flanges on the spindle, a resilient body supported on the spindle between and extending beyond the periphery of the disks and engaging the spokes and means for holding the flanges against separation.

5. A spring wheel comprising a rim, radial spokes and a hub with a central spindle, a flange fixed on said spindle and a flange adjustable on said spindle, flat apertured disks on said spindle adjacent to and located between said flanges, said disks having spoke-receiving slots adjacent to their peripheries and having enlarged recesses connected with said slots, said spokes having portions to project through said slots, headed ends for said spokes adapted to fit said recesses, and a resilient cushion located between said disks and extending circumferentially therebeyond and engaging with said spokes, said resilient cushion having slots and recesses corresponding to those of the disks in which the spokes lie, said spokes being formed of flat spring metal and pivotally connected to the rim.

6. A spring wheel comprising a hub, a rim, a plurality of radially extending spring-spokes having straight end portions and slightly curved central portions and pivotally connected with the rim and the hub, a resilient body carried by the hub in which the hub ends of the spokes are embedded, and spoke-holding disk members carried by the hub, said spokes and said disk members having interengaging portions, and means for maintaining pressure contact between said disk members and said resilient body.

7. A spring wheel comprising a hub, a rim and a plurality of spring-spokes connecting the rim and the hub, said spokes each consisting of a flat bowed spring with an eye at the hub end, a hub which consists of a spindle with flanges thereon, one of which is adjustable toward the other, means for holding said flanges in relative positions, spring-spoke retaining disks mounted upon said spindle between said flanges and provided with slots for holding the hub ends of said spring-spokes in correlative position, at least one traction-spoke coöperatively connected with the rim and hub, said retaining disks being provided with means for retaining said traction-spoke, said traction-spoke extending adjacent to the rim, a socket member on the rim into which said traction-spoke is slidably projected, said traction-spoke terminating short of contact with the rim.

8. A spring wheel comprising a hub, a rim and a plurality of spring-spokes connecting the rim and the hub, said spokes each consisting of a flat bowed spring with an eye at the hub end, a hub which consists of a spindle with flanges thereon, one of which is adjustable toward the other, spring-spoke retaining disks mounted upon said spindle between the said flanges and provided with slots for holding the hub ends of said spring-spokes in coöperative position, at least one traction-spoke coöperatively connected with the rim and the hub, said retaining disks being provided with means for retaining said traction-spoke, said traction-spoke extending adjacent to the rim, a socket member on the rim into which said traction-spoke is slidably projected, said traction-spoke terminating short of contact with the rim, and a yieldable body mounted on the hub in which the hub ends of said spokes are embedded, and means for holding the flanges of said hub in place.

9. In a wheel wherein is provided a hub and a rim with flat spring-spokes connected to the hub and pivoted to the rim; pairs of spaced lugs separately secured to the rim, pivot bolts connecting opposite lugs of a pair, on which bolts the spokes are adapted to be mounted, said lugs having concaved spoke seats adjacent to the rim which form bearings for the ends of the spokes.

10. A spring wheel comprising a rim and a hub, radial flat spring-spokes connecting the hub and rim, said hub comprising a central spindle, a flange fixed thereon, a second flange adjustable along the spindle toward the fixed flange, flat apertured spoke-holding disks on the spindle of less diameter than the hub flanges, a compressible disk on the spindle between the spoke-holding disks and of a diameter greater than that of the spoke-holding disks and recessed whereby said spoke-holding disks will be embedded in said compressible disk, said spokes having their hub ends embedded in said compressible disk and interlocked with said spoke-holding disks.

11. A spring wheel comprising a rim and a hub, radial flat spring-spokes connecting the hub and rim, said hub comprising a central spindle, a flange fixed thereon, a second flange adjustable along the spindle toward the fixed flange, flat apertured spoke-holding disks on the spindle of less diameter than the hub flanges, a compressible disk on the spindle between the spoke-holding disks and of a diameter greater than that of the spoke-holding disks and recessed to receive said spoke-holding disks, said disks all having radial spoke slots with head-receiving recesses, said spokes projecting into said slots and having heads to fit said recesses, and means for drawing said flanges toward one another.

12. A spring wheel comprising a rim and a hub, radial flat spring-spokes and traction-spokes connecting the hub and rim, said hub comprising a central spindle, a flange fixed thereon, a second flange adjustable along the spindle toward the fixed flange, flat apertured spoke-holding disks on the spindle of less diameter than the hub flanges, a compressible disk on the spindle between the spoke-holding disks, and of a diameter greater than that of the spoke holding disks, said disks having radial spring-spoke receiving slots terminating at their inner ends in head-receiving recesses, said spring-spokes having heads to fit said recesses and being adapted to project through said radial slots, said disks also having radial traction-spoke receiving slots with head recesses intermediate the ends of the slots and said traction-spokes adapted to lie in said last named radial slots and having heads located to fit the respective recesses and means for holding the hub parts together, all being arranged whereby the said traction-spokes will be rigidly retained in the spoke-holding disks.

13. A spring wheel comprising a hub, a rim, a plurality of leaf spring spokes connecting the hub and the rim, and a plurality of traction spokes interposed between the hub and the rim having connection with the hub and slidably connected with the rim, the traction spokes being relatively stiff and heavier than the spring spokes, said traction spokes having the same general form as the spring spokes, whereby said traction spokes will flex under excessive compression strains.

14. A wheel wherein is provided a hub and a rim with flat spring spokes connected to the hub and pivoted to the rim; pairs of spaced lugs separately secured to project inwardly from the inner circumferential face of the rim, pivot bolts connecting opposite lugs of a pair, on which bolts the spokes are adapted to be mounted, said lugs having concaved spoke seats adjacent to the rim which form bearings for the ends of the spokes, the ends of the spokes being spaced from the rim surface between the opposite ones of the respective pairs of lugs, substantially as shown and described.

WILLIAM A. BLACK.

Copies of this patent may be obtained for five cents each, by addressing the "Commissioner of Patents, Washington, D. C."